US006637776B2

(12) United States Patent
Tikk et al.

(10) Patent No.: US 6,637,776 B2
(45) Date of Patent: Oct. 28, 2003

(54) FLUID MANIFOLD CONNECTOR AND FLUID MANIFOLD ASSEMBLY

(75) Inventors: Laszlo D. Tikk, Columbus, IN (US); Yul J. Tarr, Columbus, IN (US); Donald J. Benson, Columbus, IN (US); John T. Carroll, III, Columbus, IN (US); Ed Morris, Columbus, IN (US)

(73) Assignee: Cummins Inc., Columbus, IN (US)

( * ) Notice: Subject to any disclaimer, the term of this patent is extended or adjusted under 35 U.S.C. 154(b) by 40 days.

(21) Appl. No.: 09/879,091

(22) Filed: Jun. 13, 2001

(65) Prior Publication Data

US 2002/0190521 A1 Dec. 19, 2002

(51) Int. Cl.[7] ......................... F16L 13/02; F02M 41/00; F02M 37/04

(52) U.S. Cl. ..................................... 285/125.1; 123/456

(58) Field of Search .............................. 285/197, 125.1, 285/190, 286, 62, 189, 133.11; 123/470, 456

(56) References Cited

U.S. PATENT DOCUMENTS

| | | | | | |
|---|---|---|---|---|---|
| 3,009,655 | A | | 11/1961 | Palmer | |
| 4,097,073 | A | | 6/1978 | Van Houtte | |
| 4,832,376 | A | * | 5/1989 | Sugao | 285/133.11 |
| 4,858,964 | A | | 8/1989 | Usui | |
| 4,860,710 | A | * | 8/1989 | Hafner et al. | 123/468 |
| 4,901,700 | A | | 2/1990 | Knight et al. | |
| 4,922,958 | A | * | 5/1990 | Lemp | 137/561 A |
| 4,953,896 | A | | 9/1990 | Usui | |
| 4,971,014 | A | * | 11/1990 | Usui | 123/470 |
| 4,996,962 | A | | 3/1991 | Usui | |
| 5,002,030 | A | * | 3/1991 | Mahnke | 123/469 |
| 5,133,645 | A | | 7/1992 | Crowley et al. | |
| 5,156,129 | A | | 10/1992 | Sumida et al. | |
| 5,169,182 | A | | 12/1992 | Hashimoto | |
| 5,197,438 | A | | 3/1993 | Yamamoto | |
| 5,222,771 | A | * | 6/1993 | Imura | 285/288.2 |
| 5,261,705 | A | | 11/1993 | Takahashi et al. | |
| 5,277,156 | A | | 1/1994 | Osuka et al. | |
| 5,295,467 | A | * | 3/1994 | Hafner | 123/456 |
| 5,311,850 | A | | 5/1994 | Martin | |
| 5,372,113 | A | * | 12/1994 | Smith | 123/456 |
| 5,374,087 | A | | 12/1994 | Powers | |
| 5,533,764 | A | * | 7/1996 | Williamson | 285/190 |
| 5,553,898 | A | | 9/1996 | Rogers, Jr. | |
| 5,562,947 | A | * | 10/1996 | White et al. | 118/500 |
| 5,607,189 | A | * | 3/1997 | Howeth | 285/190 |
| 5,619,969 | A | | 4/1997 | Liu et al. | |
| 5,646,352 | A | * | 7/1997 | Joseph et al. | 285/197 |
| 5,667,255 | A | | 9/1997 | Kato | |
| 5,782,222 | A | * | 7/1998 | Morris et al. | 123/456 |
| 5,803,051 | A | * | 9/1998 | Stehr | 12/456 |
| 5,819,704 | A | | 10/1998 | Tarr et al. | |
| 5,979,945 | A | * | 11/1999 | Hitachi et al. | 285/125.1 |
| 5,983,864 | A | * | 11/1999 | Chockley et al. | 123/468 |
| 6,007,109 | A | * | 12/1999 | Schoetz | 277/607 |
| 6,070,917 | A | * | 6/2000 | Wiebe | 285/121.5 |
| 6,405,712 | B1 | * | 6/2002 | Nomura | 123/41.31 |

* cited by examiner

*Primary Examiner*—Eric K. Nicholson
(74) *Attorney, Agent, or Firm*—Nixon Peabody LLP; Tim L. Brackett, Jr.

(57) ABSTRACT

The high-pressure fluid manifold connection assembly includes a one-piece tube collar with an annular relief cavity that surrounds a high-pressure fluid tube. The tube includes a hole that passes through the tube and which is not aligned with an exit hole in an annular relief cavity of the tube collar.

19 Claims, 3 Drawing Sheets

FLUID MANIFOLD CONNECTOR AND FLUID MANIFOLD ASSEMBLY

BACKGROUND OF THE INVENTION

1. Field of the Invention

This invention relates to high pressure fluid injection systems and, more particularly, to fluid injection connectors for a high pressure fluid manifold.

2. Description of Related Art

Fluid injection systems are evolving to provide greater flexibility and efficiency in both their application and operation. In recent years, the fuel systems industry has focused attention on the development of energy accumulating, nozzle controlled, fuel system concepts that provide engine speed and load independent control over injection timing, pressure, quantity and multiple pulse rate shape. This attention has led to the commercialization of several concepts packaged in the form of a fluid pressurizing pump connected to a hydraulic energy storage device or high-pressure common rail connected to one or more electrically operable injector nozzles. The common rail portion of these systems is called upon to conform to the physical arrangement of pumps, injectors, and other engine structures, to withstand dynamic thermal forces and, hydraulic forces, and to transfer pressurized fluid. Conventional common rails have had to be substantially robust and very stiff, forged steel rails in order to withstand the rigors of high performance operation.

SUMMARY OF THE INVENTION

Embodiments of the invention provide a modular, structurally flexible and compact fluid manifold branch connector that meets the needs of existing and future energy accumulating, nozzle controlled fluid systems without sacrificing cost effectiveness and reliability in serving a basic function to contain and transfer high-pressure fluid. Embodiments of the invention combine commercially available tubing and termination fittings with readily manufactured, mid-run, three-way connectors of a unique stress reducing design to form a connector assembly.

An exemplary embodiment of the invention has a connection that permits the use of substantially inexpensive tubing, rather than the conventionally required forged rail to supply fluid to the injectors. The tubing of the exemplary embodiment is much more flexible than the conventional forged rail and can adapt much more easily to the assembly forces, vibrational forces, thermal forces and hydraulic forces than the conventional forged rail.

The exemplary embodiment includes a symmetric tube collar through which the fluid supply tube passes. The symmetric tube collar axially surrounds the fluid supply tube and is adapted to relieve the stresses placed upon the tubing by the high pressures of the fluid. The tube collar seals to the tubing using a braze joint that operates in compression rather than in shear as conventional connectors have operated. The brazing is placed into compression by the high pressure fluid pushing outwardly on the tube walls and pushing the tube walls into contact with the tube collar. Placing the brazing into compression provides a much more reliable seal when compared to conventional braze seals which rely upon shear stress resistance.

The exemplary embodiment also includes a unique dynamic seal ring that connects the fluid injector to the tube collar. The dynamic seal ring includes a unique "C" shaped cross-section that enables the high pressure fluid to act to expand the seal into intimate contact with both the injector and the tube collar. The ability of the seal to adapt to the surfaces of the injector and the tube collar enable the use of parts that have larger manufacturing tolerances than have conventionally been required. The seal also substantially eliminates a fretting mode of failure that is commonly experienced with dynamically loaded, high-pressure seals. Additionally, the seal can be manufactured at a low cost and in a variety of sizes and shapes to suit specific applications.

The tube collar of the exemplary embodiment also includes an annular cavity that surrounds a hole that is cross-drilled through the tube. The tube collar also includes an exit bore that provides fluid communication between the annular cavity and a fluid injector connected to the tube collar. The annular cavity of the exemplary tube collar is wider than the hole cross-drilled in the tube and makes it much easier to align the hole in the tube with the cavity than in conventional designs. Additionally, the annular cavity acts as a stress reliever because the inside wall and outside wall of the tube adjacent the cross-drilled hole experience the same hydraulic pressure.

The cross-drilled hole through the tube of the exemplary embodiment is oriented substantially perpendicularly to the exit bore of the annular cavity of the tube collar of the exemplary embodiment. This orientation minimizes bending stresses across the cross-drilled hole because the hole is aligned substantially perpendicularly to the axis through which the major vibrational forces are transmitted. Additionally, the cross-drilled hole of the exemplary embodiment is also positioned just below the longitudinal axis of the tube to substantially correspond to the neutral bending axis of the tube. Also, since the cross-drilled hole of the exemplary embodiment passes entirely through both sides of the tube, the size of each hole may be reduced while still maintaining the flow rate of a single much larger hole.

BRIEF DESCRIPTION OF THE DRAWINGS

Exemplary embodiments of this invention will be described in detail, with reference to the following figures, wherein.

These and other features and advantages of this invention are described in or are apparent from the following detailed description of exemplary embodiments.

DETAILED DESCRIPTION OF EXEMPLARY EMBODIMENTS

Figure 1:
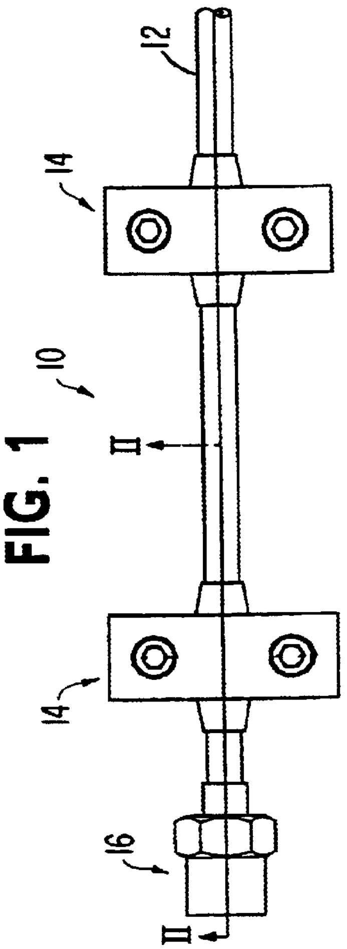
FIG. 1 is a plan view of one exemplary embodiment of a manifold in accordance with the present invention.
Figure 2:
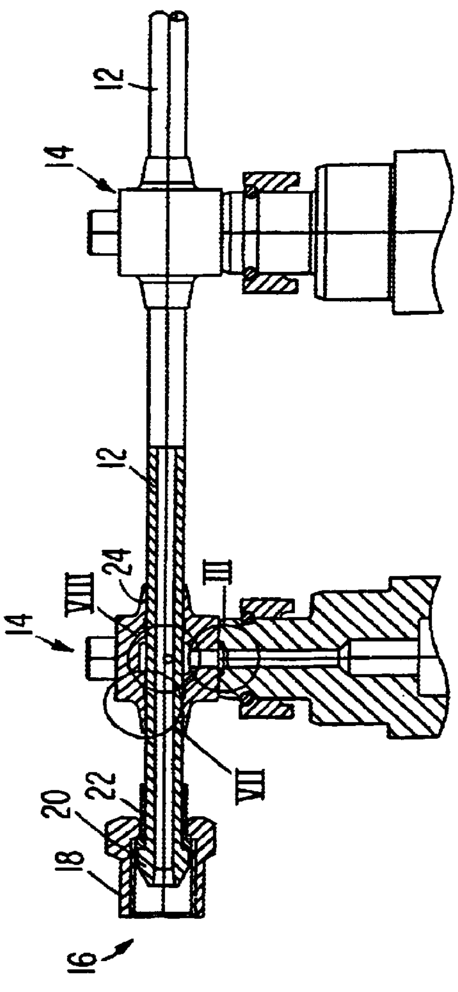
FIG. 2 is a partial cutaway view of the manifold of FIG. 1 taken along line II—II.

FIG. 1 shows a plan view of one exemplary embodiment of a fluid manifold assembly 10 in accordance with the present invention. The manifold 10 includes a seamless, extruded, high-pressure rated steel tube 12, two connections 14 and a serviceable tube end connector 16. As shown in FIG. 2, the tube 12 and connector 16 includes a nut 18 and sleeve 22 captured behind an upset tube end 20.

Figure 6:
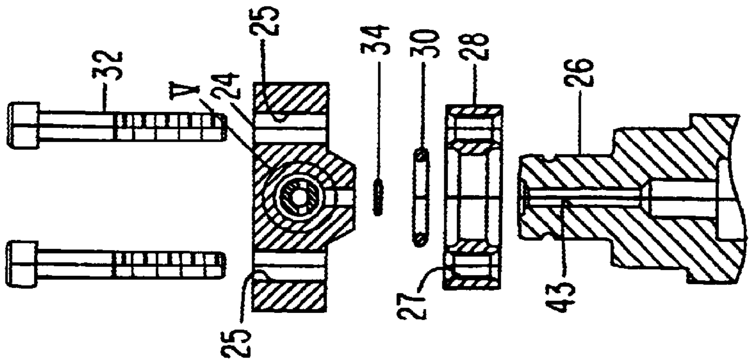
FIG. 6 is an exploded cross-sectional view of the high-pressure injection manifold of FIG. 1.

Referring to FIGS. 2 and 6, the connection 14 includes a one-piece tube collar 24 that is clamped to an injector body 26 by an injector collar 28, a retainer 30 and a pair of screws 32. The screws 32 extend through a corresponding pair of bores 25 in the tube collar 24 and engage a pair of internally threaded bores 27 in the injector collar 28. A pressure-energizing dynamically compliant seal 34 is captured between the tube collar 24 and injector body 26 to prevent leakage while minimizing the required clamping force.

Figure 3:
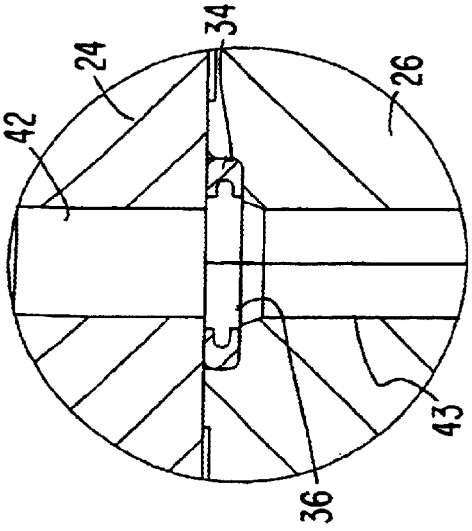
FIG. 3 shows an enlarged detail view of the area III in FIG. 2 showing the injector seal.
Figure 4:
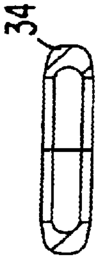
FIG. 4 is an cross-sectional view of a pressure-energizing dynamic seal of the injector seal of FIG. 3 in a pre-assembled, undeformed state.

FIG. 3 shows an enlarged detail view of the pressure-energizing dynamically compliant seal 34 installed in the high-pressure manifold shown in FIG. 2. The detail shows the seal 34 captured between the tube collar 24 and the injector body 26. The injector body 26 has a counter bore 36 that receives the seal 34. The seal 34 deforms a predetermined amount because the seal 34 is clamped between the tube collar 24 and the injector body 26. The amount that the seal 34 deforms is dependent upon the clearance provided for the seal 34. When high pressure fluid is introduced into the manifold assembly 10, the seal 34 deforms an additional amount in response to the pressure. This combination of displacement controlled clamping and the pressure energized sealing achieves excellent static and dynamic sealing performance between the tube collar 24 and the injector body 26. FIG. 4 shows a cross-sectional detail view of the seal 34 which has a substantially "C" shaped cross-section.

Figure 5:
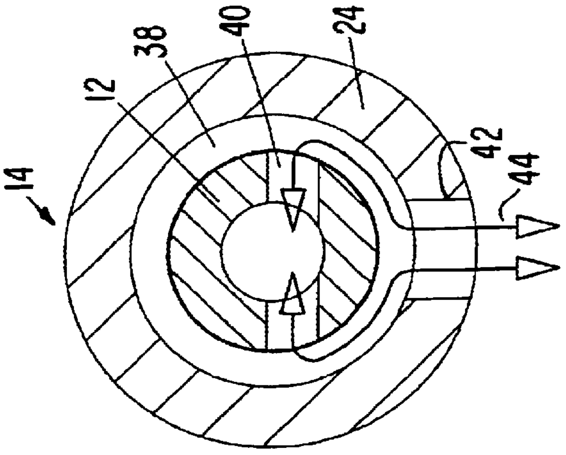
FIG. 5 is an enlarged, cross-sectional view of the area V in FIG. 6.
Figure 8:
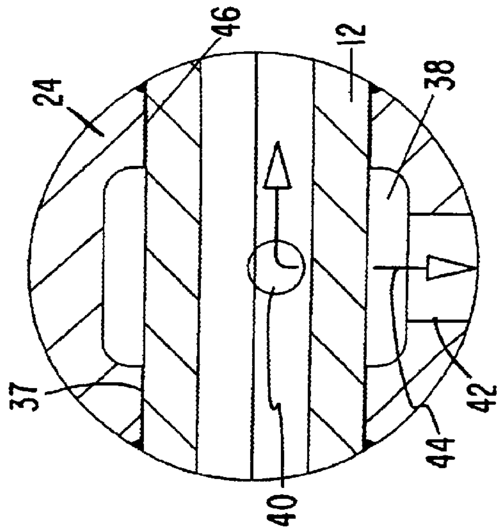
FIG. 8 is an enlarged detail view of the area VIII in FIG. 2.

FIG. 5 shows a cross-sectional view of the connection 14 of the manifold assembly 10 shown in FIG. 1. The tube collar 24 includes a receiving bore 37 (FIG. 8) for receiving tube 12, an annular relief cavity 38 surrounding the tube 12 and an exit bore 42 extending outwardly from the annular relief cavity 38 to communicate with a delivery passage 43 formed in injector 26 (FIG. 3). The tube 12 includes a cross-drilled hole 40 extending through both sides of the tube 12 and providing fluid communication between the interior of the tube 12 and the annular relief cavity 38. The axis of the cross-drilled hole 40 may be positioned slightly below the center line of the tube 12 to take advantage of a, generally, more compressive stress field resulting from the clamping loads of the tube collar 24 and along the neutral bending axis of the tube when experiencing vibrational loads. The axis of the cross-drilled hole 40 may also be oriented nonparallel to the longitudinal axis of the exit bore 42. The cross-drilled hole 40 is, preferably, substantially perpendicular to the exit bore 42 in the tube collar 24. As shown in FIG. 8, the annular relief cavity 38 of the tube collar 24 is wider than the cross-drilled hole 40 in the tube 12 which makes it much easier to align the hole 40 in the tube with the annular relief cavity 38 than in conventional designs.

FIG. 8 also shows a detail view of the annular relief cavity 38 and exit bore 42. The tube 12 passes through the annular relief cavity 38 in the collar 24. Flow lines 44 indicate a low resistance fluid flow path between the tube 12 and the injector 26. The annular relief cavity 38 and the collar 24 allow fluid of roughly the same pressure to simultaneously act on both the inner and outer walls of the tube 12 in the vicinity of the cross-drilled hole 40. Thus, the annular relief cavity 38 provides a substantial reduction in stress concentration.

Figure 7:
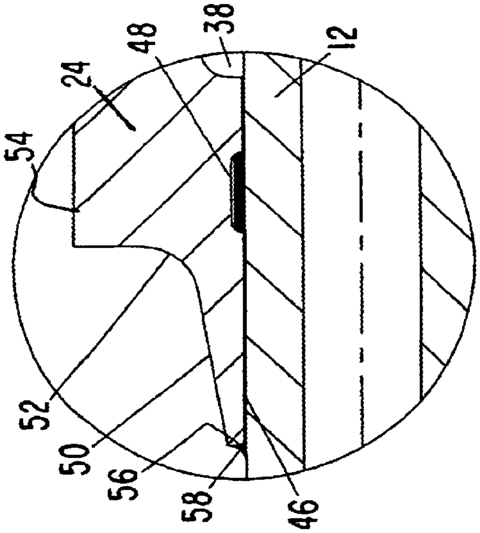
FIG. 7 is an enlarged detail of the area VII in FIG. 2 showing the braze seal of the high-pressure injection manifold of FIG. 2.

FIG. 7 shows an enlarged detail view of the seal between the collar 24 and tubing 12. The detail shows braze material 46 filling a thin annular clearance between the collar 24 and the tubing 12. The collar 24 includes an annular braze cavity 48 (or braze dam) that receives excess braze material that might otherwise migrate to the annular relief cavity 38 and block fluid passages. The collar 24 also includes a thinly tapered connector nose section 50 and transition radius 52 which provides a gradual transition from the more flexible tube 12 to the less flexible connector main body 54 to reduce stress concentrations. The thinly tapered connector nose section 50 ends in a small inner-edge radius 56 and a braze fillet 58. The inner-edge radius 56 and a braze fillet 58 also reduce stress concentrations.

The manifold connection system of the present invention reduces the possibility for high-pressure fluid to act on an internally exposed tubing end face, and thereby, avoids creating shear stress in the braze material as would be the case for a butt-assembled joint. The pass-through configuration of the present invention does not depend on the braze material to serve a significant structural function under shear but, rather, seals well under radial compression. The hydraulic pressure of the fluid in the tube 12 pushes outwardly on the walls of the tube 12 and forces the braze material 46 into intimate contact with the collar 24. Therefore, the braze material 46 experiences compression stresses that assist in sealing the collar 24 to the tube 12.

While this invention has been described in conjunction with the specific embodiment outlined above, it is evident that many alternatives, modifications and variations are apparent to those skilled in the art. Accordingly, the embodiment of the invention as set forth above is intended to be illustrative and not limiting. Various changes may be made without departing from the spirit and scope of the invention.

What is claimed is:

1. A fluid manifold branch assembly for connection to a plurality of fuel injectors, comprising:

- a tube including a hole extending transversely through the tube;
- a plurality of one-piece tube collars mounted on said tube in spaced relationship, each of said tube collars including a receiving bore receiving the tube and an exit bore for directing fluid from the receiving bore;
- a pair of threaded screws extending through a corresponding set of bores extending through one of the plurality of tube collars;
- an injector collar associated with said one of the tube collars and including a pair of threaded bores receiving the threaded screws and a counter bore.

2. The assembly of claim 1, wherein the tube collar is symmetric.

3. The assembly of claim 1, wherein the hole through the tube is offset from the center line of the tube closer to the exit bore in the tube collar.

4. The assembly of claim 1, wherein the exit bore is substantially perpendicular to the hole extending transversely through the tube.

5. The assembly of claim 1, wherein the tube collar includes:

- an annular relief cavity that is adapted to receive braze material;
- a main body that extends to a thinly tapered nose section; and
- a transition radius between the main body and the nose section, wherein the thinly tapered nose section ends with a small inner-edge radius.

6. A fluid manifold branch assembly for connection to a plurality of fuel injectors, comprising:

a tube including a hole extending transversely through the tube;

a tube collar including a receiving bore receiving the tube and an exit bore for directing fluid from the receiving bore, wherein a central axis of the exit bore intersects, and is non-parallel to, a longitudinal axis of the hole extending transversely through the tube;

an annular relief cavity that is adapted to receive braze material;

a main body that extends to a thinly tapered nose section; and a transition radius between the main body and the nose section, wherein the thinly tapered nose section ends with a small inner-edge radius.

7. The assembly of claim 6, wherein the tube collar is symmetric.

8. The assembly of claim 6, further comprising:

a pair of threaded screws extending through a corresponding set of bores extending through one of the plurality of tube collars;

an injector collar associated with said one of the tube collars and including a pair of threaded bores receiving the threaded screws and a counter bore.

9. The assembly of claim 6, wherein the hole through the tube is offset from the center line of the tube closer to the exit bore in the tube collar.

10. The assembly of claim 6, wherein the exit bore is substantially perpendicular to the hole extending transversely through the tube.

11. A fluid manifold branch assembly for connection to a plurality of fuel injectors, comprising;

a tube including a hole extending transversely through the tube;

a plurality of tube collars mounted on the tube, each of said plurality of tube collars including a receiving bore receiving the tube, a first annular relief cavity surrounding the tube and an exit bore for directing fluid from the annular relief cavity toward a respective injector;

a pair of threaded screws extending through a corresponding set of bores extending through one of the plurality of tube collars;

an injector collar associated with said one of the tube collars and including a pair of threaded bores receiving the threaded screws and a counter bore.

12. The assembly of claim 11, wherein the tube collar is symmetric.

13. The assembly of claim 11, wherein the hole through the tube is offset from the center line of the tube closer to the exit bore in the tube collar to substantially align with an operating neutral axis.

14. The assembly of claim 11, wherein the exit bore is substantially perpendicular to the hole extending transversely through the tube.

15. The assembly of claim 11, wherein the tube collar includes:

a second annular relief cavity that is adapted to receive braze material;

a main body that extends to a thinly tapered nose section; and a transition radius between the main body and the nose section, wherein the thinly tapered nose section ends with a small inner-edge radius.

16. The assembly of claim 1, further comprising a retainer positioned in the counter bore and an injector extending through the injector collar, wherein said retainer retains the injector in the injector collar.

17. A fluid manifold branch assembly for connection to a plurality of fuel injectors, comprising:

a tube including a hole extending transversely through the tube;

a tube collar including a receiving bore receiving the tube and an exit bore for directing fluid from the receiving bore, wherein a central axis of the exit bore intersects, and is non-parallel to, a longitudinal axis of the hole extending transversely through the tube;

a pair of threaded screws extending through a corresponding set of bores extending through one of the plurality of tube collars;

an injector collar associated with said one of the tube collars and including a pair of threaded bores receiving the threaded screws and a counter bore;

further comprising a retainer positioned in the counter bore and an injector extending through the injector collar, wherein said retainer retains the injector in the injector collar.

18. The assembly of claim 11, further comprising a retainer positioned in the counter bore and an injector extending through the injector collar, wherein said retainer retains the injector in the injector collar.

19. A tube collar for a fluid manifold assembly, the tube collar comprising a receiving bore adapted to surroundingly receive a tube for the manifold assembly and an exit bore for directing fluid from the receiving bore, wherein the tube collar is one-piece and further comprising a set of bores integrally formed in and extending through said one-piece collar, said bores adapted to receive a pair of threaded screws.

* * * * *